(12) United States Patent
Yang et al.

(10) Patent No.: US 10,922,119 B2
(45) Date of Patent: Feb. 16, 2021

(54) COMMUNICATIONS BETWEEN VIRTUAL DUAL CONTROL MODULES IN VIRTUAL MACHINE ENVIRONMENT

(71) Applicant: EMC IP Holding Company LLC, Hopkinton, MA (US)

(72) Inventors: Lifeng Yang, Beijing (CN); Jian Gao, Beijing (CN); Xinlei Xu, Beijing (CN); Ruiyong Jia, Beijing (CN); Yousheng Liu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 134 days.

(21) Appl. No.: 16/021,262

(22) Filed: Jun. 28, 2018

(65) Prior Publication Data

US 2019/0004847 A1 Jan. 3, 2019

(30) Foreign Application Priority Data

Jun. 30, 2017 (CN) .......................... 2017 1 0526265

(51) Int. Cl.
*G06F 9/455* (2018.01)
*G06F 13/40* (2006.01)
(Continued)

(52) U.S. Cl.
CPC ........ *G06F 9/45558* (2013.01); *G06F 13/105* (2013.01); *G06F 13/4022* (2013.01);
(Continued)

(58) Field of Classification Search
CPC ............... G06F 9/45558; G06F 13/105; G06F 13/4022; G06F 13/4282; G06F 2213/0026;
(Continued)

(56) References Cited

U.S. PATENT DOCUMENTS 8,930,608 B2    1/2015  Li
9,996,484 B1 *  6/2018  Davis ................... G06F 13/105
(Continued)

FOREIGN PATENT DOCUMENTS

WO     20110140028     11/2011

*Primary Examiner* — Eric C Wai
(74) *Attorney, Agent, or Firm* — BainwoodHuang

(57) ABSTRACT

Embodiments of the present disclosure relate to communications between virtual dual control modules in a virtual machine environment. A computer-implemented method and an electronic device are disclosed. The method includes deploying a first virtual control module and a second virtual control module in a virtual storage, the first virtual control module and the second virtual control module are redundant with each other. The method further comprises creating a virtual Peripheral Component Interconnect Express (PCIe) switch for emulating a physical PCIe switch, and synchronizing cache data between the first virtual control module and the second virtual control module via the virtual PCIe switch. In the embodiments of the present disclosure, virtual dual control modules are configured in the virtual machine environment, and virtual PCIe communications between virtual dual control modules are realized by emulating the physical PCIe through software, thereby enabling low-latency communications between virtual dual control modules in a virtual storage.

23 Claims, 7 Drawing Sheets

(51) Int. Cl.
*G06F 13/42* (2006.01)
*G06F 13/10* (2006.01)

(52) U.S. Cl.
CPC .............. *G06F 13/4282* (2013.01); *G06F 2009/45579* (2013.01); *G06F 2009/45595* (2013.01); *G06F 2213/0024* (2013.01); *G06F 2213/0026* (2013.01)

(58) Field of Classification Search
CPC ... G06F 2009/45595; G06F 2213/0024; G06F 2009/45579; G06F 3/0614; G06F 3/0658; G06F 3/0664; G06F 3/0683; G06F 11/1658; G06F 11/2089; G06F 13/1668; Y02D 10/00
See application file for complete search history.

(56) References Cited

U.S. PATENT DOCUMENTS 10,503,618 B2    12/2019  Breakstone et al.
2018/0232142 A1*  8/2018  Shekar ................ G06F 11/2089

* cited by examiner

COMMUNICATIONS BETWEEN VIRTUAL DUAL CONTROL MODULES IN VIRTUAL MACHINE ENVIRONMENT

RELATED APPLICATIONS

This application claim priority from Chinese Patent Application Number CN201710526265.9, filed on Jun. 30, 2017 at the State Intellectual Property Office, China, titled "A METHOD TO IMPLEMENT THE DUAL-CONTROLLER COMMUNICATION FOR VNX STORAGE IN VIRTUAL MACHINE ENVIRONMENT" the contents of which is herein incorporated by reference in its entirety.

FIELD

Embodiments of the present disclosure generally relate to the field of storage technology, and more specifically, to communications between virtual dual control modules in a virtual machine environment.

BACKGROUND

A storage system refers to a system comprising a disk device, a control module and a device and program for managing information scheduling. It can generally store a large amount of data. To ensure reliability of data storage, the storage system is generally configured with two peer control modules for redundancy with each other, while the two control modules maintain data synchronization therebetween. A virtual storage is a storage created on a physical device using software, which can provide the user with a logic storage space so as to enable the user to implement functions similar to a physical storage system.

Peripheral Component Interconnect (PCI) is a parallel computer bus standard used to connect peripheral components to a computer. PCI Express (PCIe) is a bus and interface standard. Unlike PCI bus, PCIe uses point-to-point serial communication and can increase data transmission rate to a very high frequency. Typically, two peer control modules in the storage system use PCIe to communicate, thereby performing data synchronization and backup.

SUMMARY

Embodiments of the present disclosure provide a method and device for communications between virtual dual control modules in a virtual machine environment. In the embodiments of the present disclosure, virtual dual control modules are configured in a virtual machine environment and physical PCIe is emulated through software to achieve virtual PCIe communications between virtual dual control modules, thereby enabling low-latency communications between virtual dual control modules in a virtual storage.

In an aspect of the present disclosure, a computer-implemented method is provided. The method comprises deploying a first virtual control module and a second virtual control module in a virtual storage, and the first virtual control module and the second virtual control module are redundant with each other. The method further comprises creating a virtual PCIe switch for emulating a switch of a physical PCIe and synchronizing cache data between the first virtual control module and the second virtual control module via the virtual PCIe switch.

In another aspect of the present disclosure, an electronic device is provided. The electronic device comprises a processing unit and a memory coupled to the processing unit and storing instructions. The instructions, when executed by the processing unit, perform the actions of deploying a first virtual control module and a second virtual control module in the virtual storage device, and the first virtual control module and the second virtual control module are redundant with each other; creating a virtual PCIe switch for emulating the switch of the physical PCIe; and synchronizing cache data between the first virtual control module and the second virtual control module via the virtual PCIe switch.

In still another aspect of the present disclosure, there is provided a computer program product which is tangibly stored on a non-transient computer-readable medium and includes computer-executable instructions, and the computer-executable instructions, when executed, cause the computer to perform the method according to the embodiments of the present disclosure.

This Summary is provided to introduce a selection of concepts in a simplified form that are further described below in the Detailed Description. This Summary is not intended to identify key features or essential features of the present disclosure, nor is it intended to be used to limit the scope of the embodiments of the present disclosure.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference signs usually represent the same components.

DETAILED DESCRIPTION OF EMBODIMENTS

Figure 1:
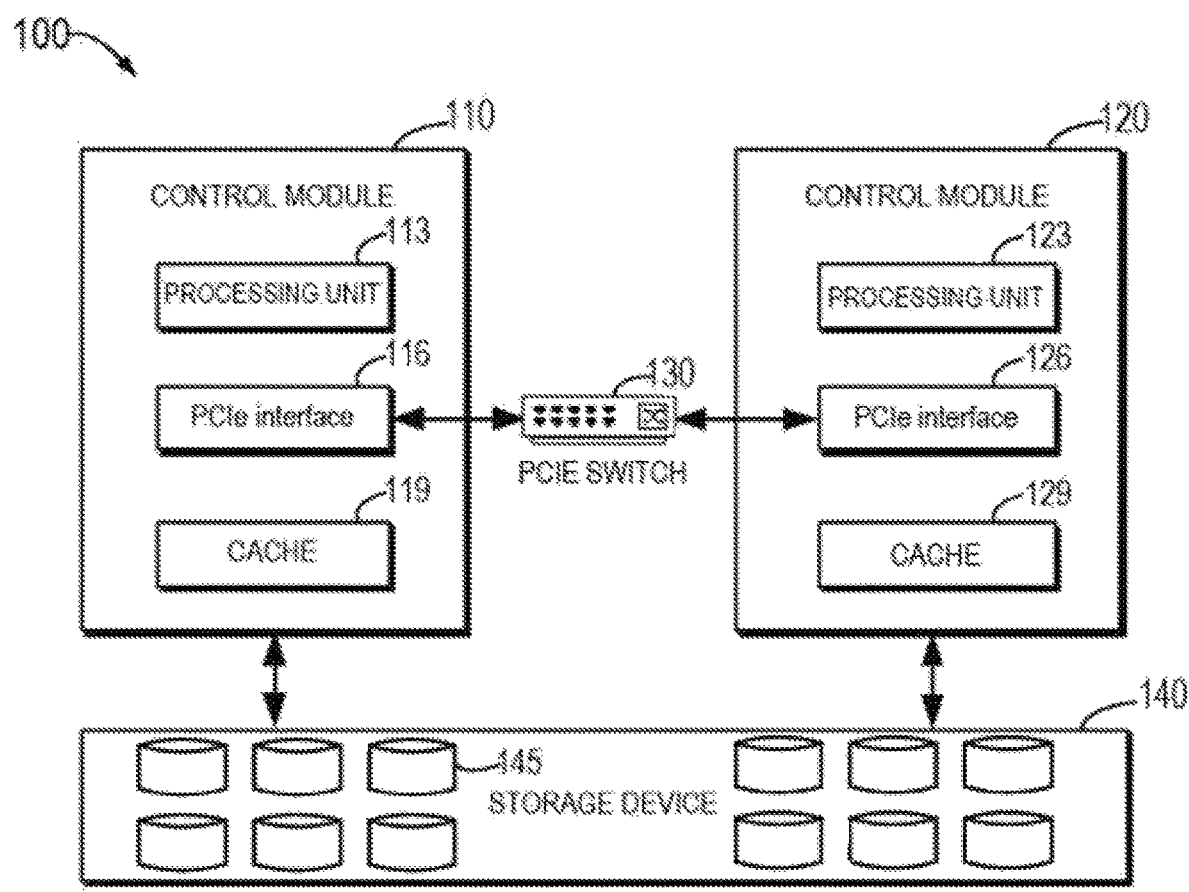
FIG. 1 is a schematic diagram illustrating a storage environment having dual control modules in accordance with embodiments of the present disclosure.

Preferred embodiments of the present disclosure will be described in the following text in greater detail with reference to the drawings. Although preferred embodiments of the present disclosure are displayed in the drawings, it should be understood that the present disclosure can be implemented in various manners, not limited to the embodiments illustrated herein. On the contrary, these embodiments are provided to make the present disclosure more thorough and complete and convey the scope of the present disclosure completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "an example embodiment" and "an embodiment" are to be read as "at least one example embodiment." The term "another embodiment" is to be read as "at least another embodiment." Terms "first," "second" and others can denote different or identical objects. The following text may also contain other explicit or implicit definitions.

Traditionally, in a physical storage apparatus or system having dual control modules, data is transmitted between the two peer control modules over a PCIe bus so that each control module can communicate with its peer control module in low-latency communication. The two control modules use a PCIe bus to communicate and thus, which requires a physical PCIe switch. However, in some scenarios, a virtual storage should be provided for purposes of experiment, testing and so on. As physical PCIe switches do not exist in the virtual environment, it is impossible to configure two virtual control modules.

To improve the reliability of the virtual storage, an improvement for the traditional method is to attempt to also configure virtual dual control modules in the virtual storage, and realize communications between the virtual dual control modules through Ethernet, for example, using a virtual network interface card (vNIC). However, Ethernet takes TCP/IP protocol as means of communication, and has the defects of high latency and low throughput rate and so on, as compared with PCIe communication, hence it fails to meet the communication requirements of high speed and low latency between virtual dual control modules. Other improvements involve communication that is based on shared storage and communication that is based on a third node of the voting device. However, these improvements also have high latency and thus, cannot meet the communication requirements of high speed and low latency between virtual dual control modules.

Embodiments of the present disclosure provide a novel manner of communications between virtual dual control modules in a virtual machine environment. Embodiments of the present disclosure create a virtual PCIe switch for emulating the physical PCIe switch by configuring virtual dual control modules in a virtual machine environment, and synchronize cache data between two virtual control modules via the virtual PCIe switch. Therefore, embodiments of the present disclosure enable low-latency communication between virtual dual control modules in a virtual storage without causing degradation of other performances in the virtual machine environment. Besides, embodiments of the present disclosure enable address translation of address space between different virtual control modules by emulating various functions of physical PCIe. By use of a physical abstract layer, embodiments of the present disclosure make it unnecessary to modify the conventional upper layer transmission, thereby being compatible with the existing virtual storages or systems. Moreover, embodiments of the present disclosure further enable automatic adjustment of control flow of the virtual PCIe switch through an automatic negotiation mechanism, thereby improving the storage performance of the virtual storage.

Basic principles and several example embodiments of the present disclosure will be described below with reference to FIGS. 1-7. FIG. 1 is a schematic diagram illustrating a storage environment 100 having dual control modules in accordance with embodiments of the present disclosure. Stability and high availability are basic requirements of the storage apparatus or system, which requires the provision of a backup mechanism of redundancy, such as forming redundant array of independent disks (RAID) through a plurality of disks to ensure the reliability of permanent data storage, and controlling the storage operation of the storage apparatus by configuring two redundant controllers, so as to reduce the possibility of losing cache data.

As illustrated in FIG. 1, the storage environment 100 includes a control module 110 (also referred to as "controller"), a control module 120, a PCIe switch 130 and a storage device 140 (such as a storage device array). The control module 110 is interconnected with the control module 120 via the PCIe switch 130 while the control modules 110 and 120 are further connected to the storage device 140.

In some embodiments, the storage environment 100 further includes a host device (not shown) which may read data from or write data to the disk in the storage system. For example, the host device may be a server (such as an application server or flow media server) or a computing device (such as a desktop computer, a laptop computer, a handheld computer, a smart phone, a tablet computer, a wearable and the like).

The control modules 110 and 120 refer to devices for storage control of data storage in the storage environment 100. As shown in FIG. 1, the control module 110 includes a processing unit 113 (a single core or multi-core processor), a PCIe interface component 116, a cache 119 (such as a dynamic random access memory (DRAM) cache), while the control module 120 includes a processing unit 123, a PCIe interface component 126 and a cache 129. For example, caches 119 and 129 may be multi-core caches (MCC) and multi-core express fast caches (MCF) and the like.

The PCIe interface component 116 in the control module 110 may communicate with the PCIe interface component 126 in the control module 120 via the PCIe switch 130, for instance, to synchronize cache data. In some embodiments, PCIe interface may be packaged into a common message interface (CMI) for control information transmission and data mirror link between dual control modules, such as direct memory access (DMA). Since PCIe switch 130 is a physical switch enabling PCIe while PCIe communication protocol can realize low latency, high throughput and high power consumption, control modules 110 and 120 can ensure the reliable and efficient operation of the storage system.

In some embodiments, the PCIe switch 130 enables DMA operation (such as RDMA). RDMA is a technology enabling direct communication from a remote memory to the memory, requiring no processors or processing units. With an RDMA-enabled network adaptor, all the packets and protocol processing for communication can be implemented on the hardware of the network adaptor, thereby improving the access performance.

The storage device 140 includes a plurality of disks 145. Examples of disks 145 include, but not limited to, a magnetic disk, an optical disk and so on. The storage device 140 may be an array (namely, logic disk) in which a plurality of independent physical disks form a disk in different manners, and it can provide higher storage performance and higher reliability than a single disk. To restore data when a certain disk in the storage device 140 fails, generally, one or more parity check information block are configured.

Figure 2:
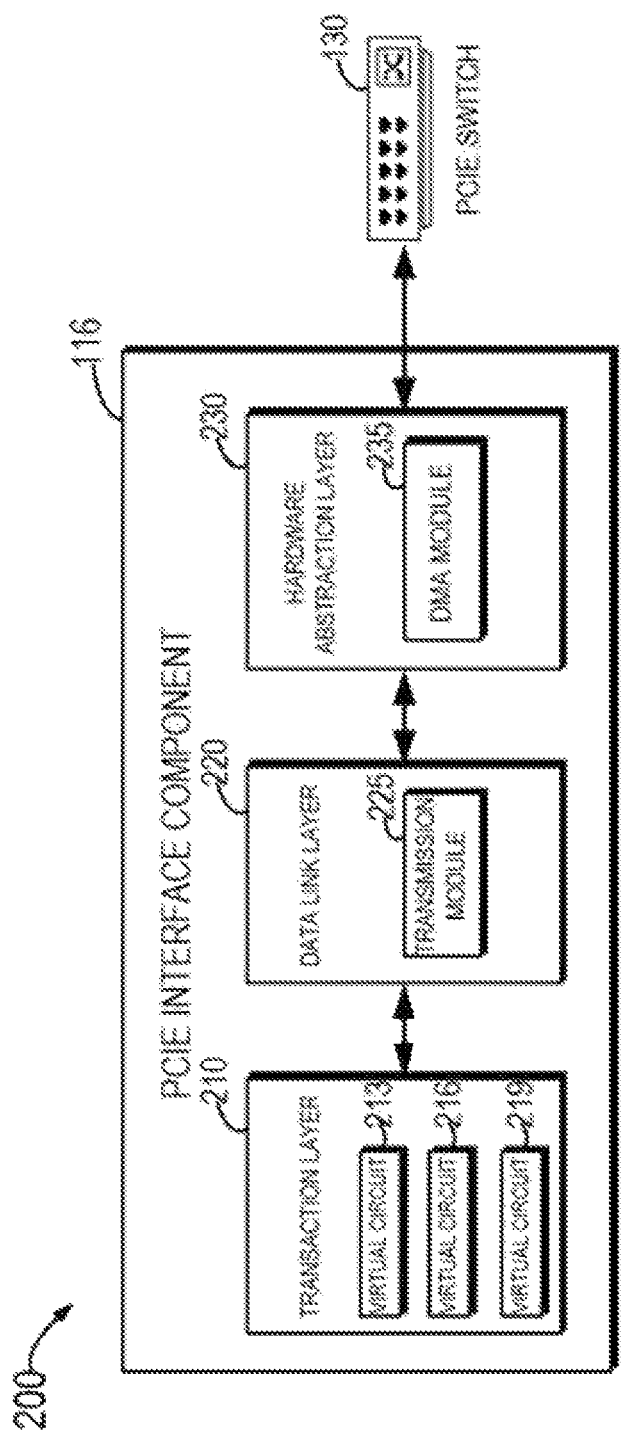
FIG. 2 is a schematic diagram illustrating an architecture of a PCIe interface component in accordance with embodiments of the present disclosure.

FIG. 2 is a schematic diagram illustrating an architecture 200 of a PCIe interface component in accordance with embodiments of the present disclosure. As shown in FIG. 2, the PCIe interface component 116 includes a transaction layer 210, a data link layer 220 and a hardware abstraction layer 230. The transaction layer 210 includes a plurality of virtual circuits 213, 216 and 219 as master interfaces for communicating with other components in the PCIe interface component 116. The data link layer 220 includes a PCIe transmission module 225 for implementing data communication at the link layer of the PCIe bus and communication with the peer control module on the PCIe bus. The hardware abstraction layer 230 is used to abstract the hardware so as to provide hardware-indistinguishing identical operation interface (for instance, as a single device object) to the upper layer (such as transaction layer 210, and data link layer 220). The hardware abstraction layer 230 includes a DMA module 235 for enabling DMA operations between the control module 110 and other control modules (such as control module 120) or other devices via the PCIe switch 130.

Figure 3:
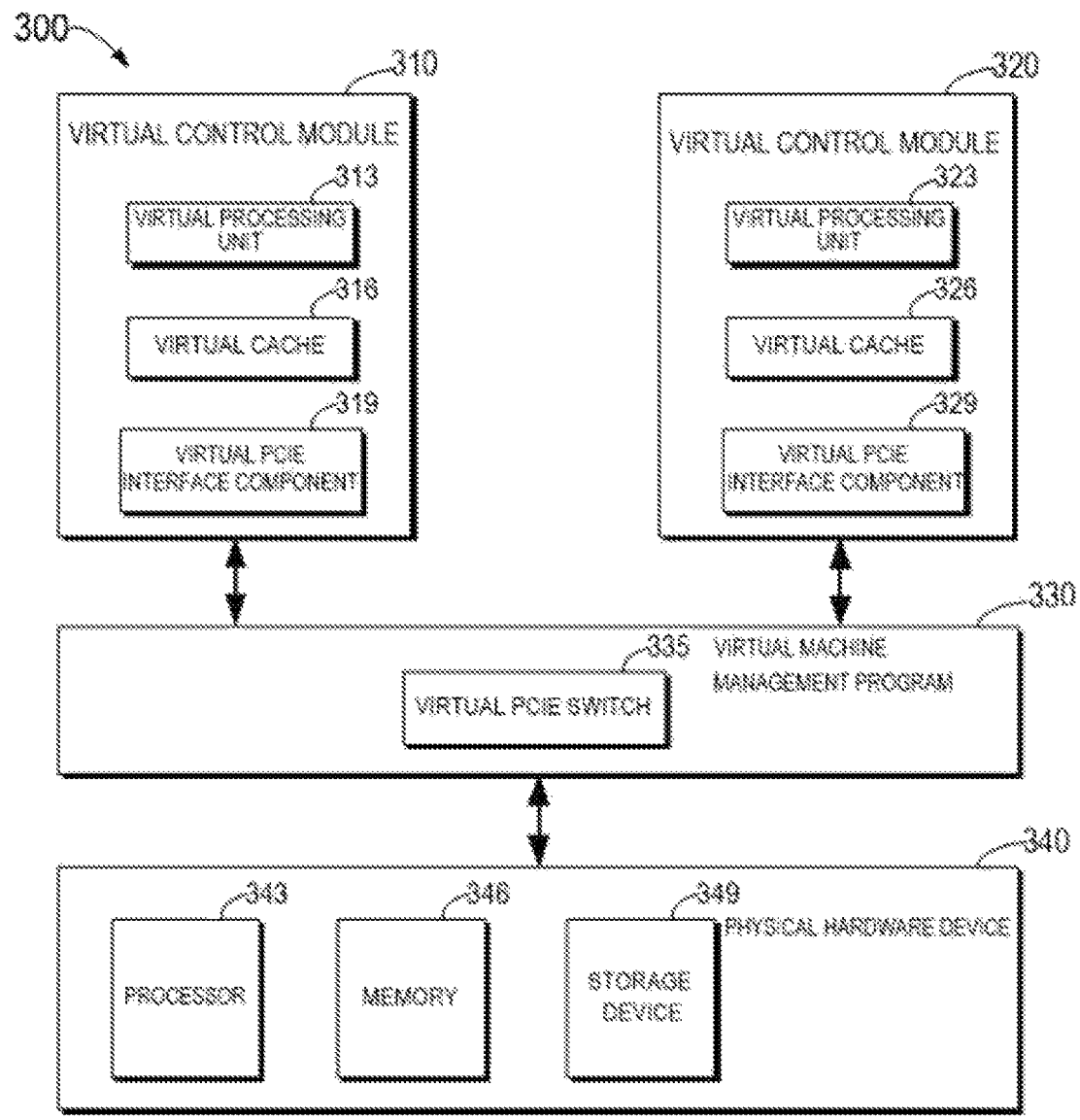
FIG. 3 is a schematic diagram illustrating a storage environment having virtual dual control modules in accordance with embodiments of the present disclosure.

FIG. 3 is a schematic diagram illustrating a storage environment 300 having virtual dual control modules in accordance with embodiments of the present disclosure. It differs from the physical storage environment 100 shown in FIG. 1 in that the storage environment 300 is a virtualized storage scenario. For example, a virtualizer may be deployed or configured on the physical hardware to implement the virtual storage through software. Generally, the virtual storage may be implemented by installing software on a local computing device and can be used to test or experiment functionality similar to a physical storage device. Different from the physical storage apparatus, the virtual storage has the advantages of convenience, mobility and lightweight. In addition, the cost is usually lower because there is no need to purchase physical hardware device.

As shown in FIG. 3, the storage environment 300 includes a virtual control module 310 (also referred to as "a first virtual control module"), a virtual control module 320 (also referred to as "a second virtual control module"), a virtual machine management program 330 and a physical hardware device 340. As a single virtual controller cannot ensure high reliability of the virtual storage, it is necessary to configure virtual dual control modules. In the storage environment 300, the virtual control module 310 and the virtual control module 320 are redundant with each other. In a normal working mode, two virtual control modules may synchronize cache data in real time. When one virtual control module fails, the other one continues to operate to ensure the normal operation of the system.

As illustrated in FIG. 3, the virtual control module 310 includes a virtual processing unit 313, a virtual cache 316 and a virtual PCIe interface component 319, while the virtual control module 320 includes a virtual processing unit 323, a virtual cache 326 and a virtual PCIe interface component 329. PCIe specification has defined single-root I/O virtualization (SR-IOV) so that a plurality of virtual machines in the virtual machine environment can share a single PCIe hardware interface.

As illustrated in FIG. 3, the virtual control module 310 is interconnected with the virtual control module 320 via the virtual machine management program 330 which serves as a virtual agent and includes a virtual PCIe switch 335 that is implemented by emulating the physical PCIe switch (the PCIe switch 130 shown in FIG. 1). In the storage environment 300, since the virtual PCIe switch 335 having functionality similar to the physical PCIe switch is emulated, communications with low-latency and high throughput can be realized between the virtual control module 310 and the virtual control module 320. For example, the virtual control module 310 may send cache data to the virtual control module 320 through the virtual PCIe switch 335 and write cache data to the array of virtual disks in the virtual storage.

The physical hardware device 340 includes a physical device on which the virtual storage in the virtualized storage environment is hosted, including, for example, a processor 343, a memory 346, a storage device 349, and the like. In some embodiments, the physical hardware device 340 may be a cloud-based device or multiple distributed devices. Therefore, embodiments of the present disclosure implement virtual PCIe communication between virtual dual control modules through software emulation of physical PCIe and can achieve low-latency communication between virtual dual control modules in the virtual storage.

Figure 4:
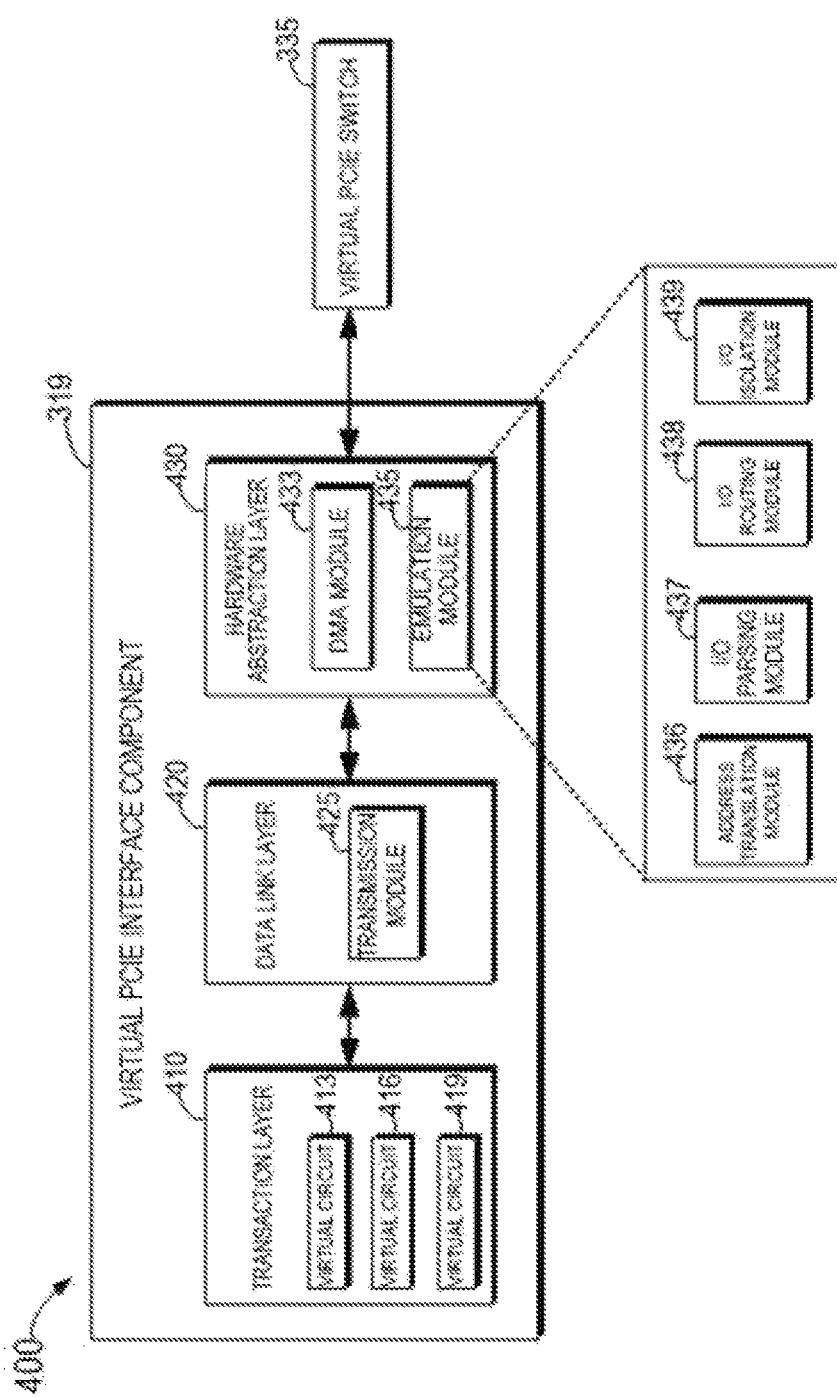
FIG. 4 is a schematic diagram illustrating an architecture of a virtual PCIe interface component in accordance with embodiments of the present disclosure.

FIG. 4 is a schematic diagram illustrating an architecture 400 of a virtual PCIe interface component in accordance with embodiments of the present disclosure. As illustrated in FIG. 4, the virtual PCIe interface component 319 includes a transaction layer 410, a data link layer 420 and a hardware abstraction layer 430. The transaction layer 410 includes a plurality of virtual circuits 413, 416 and 419 as master interfaces for communicating with other components in the PCIe interface component 319. The data link layer 420 includes a PCIe transmission module 425 for implementing data communication at the link layer. The hardware abstraction layer 430 is used to abstract the hardware so as to provide the same operation interface indistinguishing to hardware or virtual hardware to the upper layer (such as transaction layer 410 and the data link layer 420), including a DMA module 433 which is used to implement DMA operation between the virtual control module 310 and other control modules (such as control module 320) or other devices via a virtual PCIe switch 335. For instance, it is possible to implement DMA operation between the hardware abstraction layers of the two virtual control modules through the virtual PCIe switch.

It differs from the PCIe interface component 116 depicted above with reference to FIG. 2 in that the hardware abstraction layer 430 in the virtual PCIe interface component 319 in FIG. 4 further includes an emulation module 435 which emulates the function of the physical PCIe through software and implements communications between virtual control modules. As illustrated in FIG. 4, the emulation module 435 may include an address translation module 436 for translating PCIe address between the virtual machine and the physical device, an I/O parsing module 437 for parsing I/O command, an I/O routing module 438 for routing I/O to a virtual machine or physical device, and an I/O isolation module 439 for isolating I/O.

In some embodiments, the emulation module 435 may define the identifier of the virtual PCIe switch as well as other functions, such as DMA control module support, DMA burst data transmission mode, DMA suspension, mailbox service, compulsory link and disconnecting links.

In some embodiments, a size of a buffer at the virtual PCIe switch may be adjusted dynamically based on the message feedback received from the PCIe physical device, thereby implementing the automatic negotiation mechanism. The transaction layer 410 supports a plurality of links which correspond to a plurality of virtual circuits, respectively. Once the received communication proceeds to be processed, the buffer control is performed. If the transaction layer 410 finds an acknowledgement of slow message on a link, it will attempt to re-transmit the message over other links. In the virtual PCIe switch 335, retransmission is serialized to prevent DMA on the received data. In some embodiments, the length of the buffer ring in a virtual PCIe environment may be limited to avoid overload and the length of the ring is adjusted based on the acknowledgement of slow message. For example, when the message acknowledgement slows down, the length of the ring will be reduced to decrease the load. Therefore, by use of the introduction of an automatic negotiation mechanism, overload of the virtual PCIe switch may be avoided.

Figure 5:
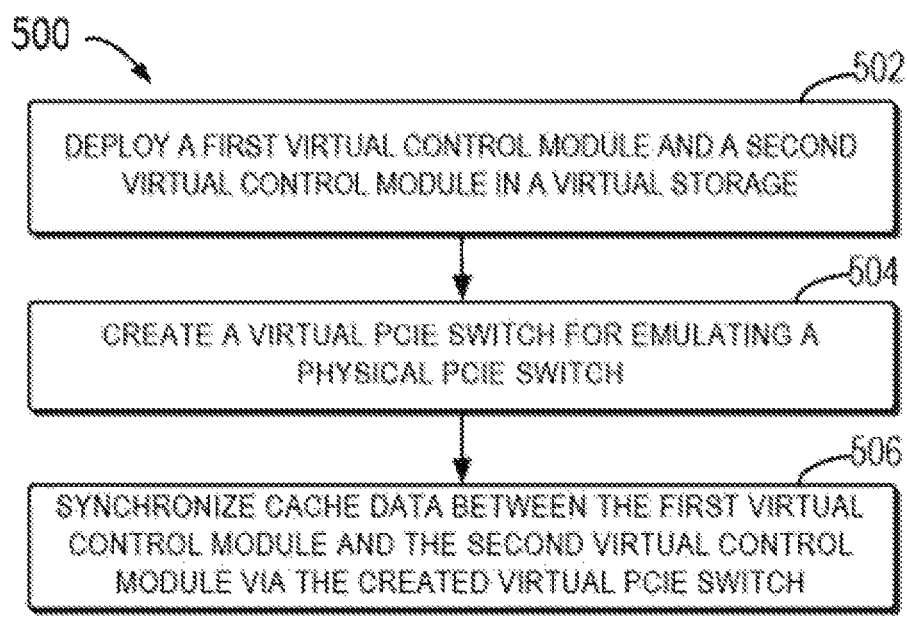
FIG. 5 is a flowchart illustrating a method for implementing communications between virtual dual control modules in accordance with embodiments of the present disclosure.

FIG. 5 is a flowchart illustrating a method 500 for implementing communication between virtual dual control modules in accordance with embodiments of the present disclosure. It is to be understood that method 500 may be executed by the processor 343 depicted above with reference to FIG. 3.

At 502, the first virtual control module (such as the virtual control module 310 shown in FIG. 3) and the second virtual control module (such as the virtual control module 320 shown in FIG. 3) are deployed in the virtual storage, and the first virtual control module and the second virtual control module are redundant with each other. When one virtual control module fails, the other will continue to operate so as to realize highly reliable operation of the virtual storage.

At 504, a virtual PCIe switch (such as the virtual PCIe switch in FIG. 3) for emulating the physical PCIe switch (such as the PCIe switch 130 in FIG. 1) is created. For example, at least one of the following functions of the physical PCIe switch may be emulated: PCIe address translation, I/O routing, I/O parsing, I/O isolation and so on.

At 506, cache data are synchronized between the first virtual control module and the second virtual control module via the virtual PCIe switch. For example, the virtual control module 310 synchronizes cache data with the virtual control module 320 via the virtual PCIe switch 335. Therefore, embodiments of the present disclosure enable low-latency communications between virtual dual control modules in the virtual storage by emulating physical PCIe to realize virtual PCIe communications between virtual dual control modules.

Figure 6:
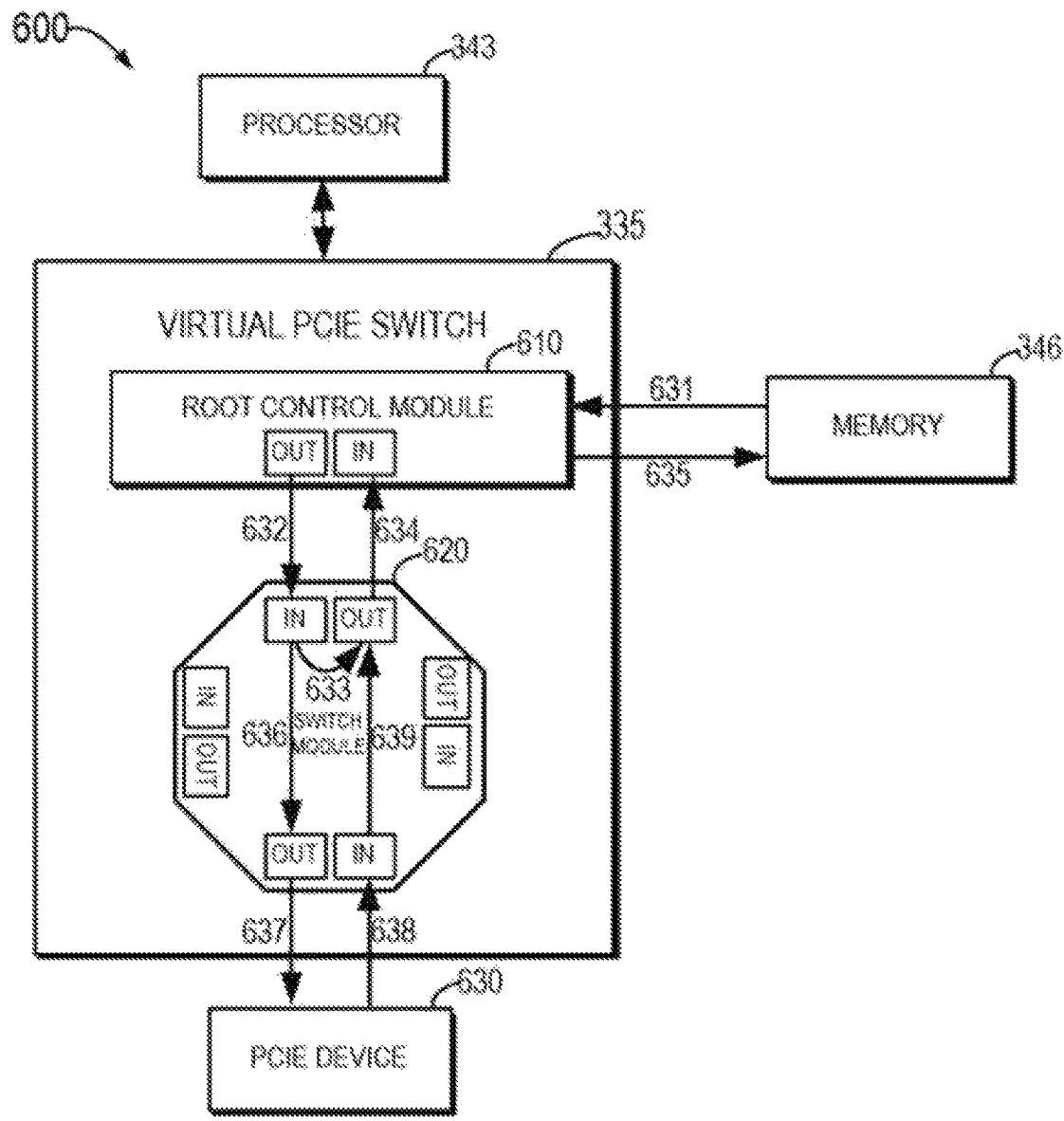
FIG. 6 is a schematic diagram illustrating an architecture of a virtual PCIe switch in accordance with embodiments of the present disclosure.

FIG. 6 is a schematic diagram illustrating an architecture 600 of a virtual PCIe switch in accordance with embodiments of the present disclosure. As shown in FIG. 6, the architecture 600 includes a processor 343, a memory 346, a virtual PCIe switch 335 and PCIe device 630, where the virtual PCIe switch 335 includes a root control module 610 and a switch module 620.

The virtual PCIe switch may have an upstream port and a plurality of downstream ports, and each port may be a bridge with PCIe configuration control, each configuration describes the range of device address space that it is connected to. For the upstream port, configuration of all the downstream devices can be described; and for any downstream port, the address is described by the port configuration to which it is connected.

In the virtual storage based on virtual dual control modules, with the communication link consisting sequentially of arrows 631, 632, 633, 634 and 635, the storage position of data in different virtual control modules in memory 346 may be changed. Therefore, with the virtual PCIe switch according to the embodiments of the present disclosure, packet transmission between different virtual control modules may be implemented inside the memory.

In addition, communications between the memory and the PCIe device 630 may be realized, for instance, the communication link consisting sequentially of arrows 631, 632, 636, 637, 638, 639, 634 and 635. The reading and writing request (carrying the address of the destination) transmitted by the memory 346 is passed to the root control module 610 in the virtual PCIe switch, and then is compared with the address in the port configuration space and delivered to the switch module 620 and to the PCIe device 630.

In some embodiments, it is possible to achieve communication between virtual control modules with a virtual non-transparent bridge which may connect two PCIe address spaces. For instance, it is possible to generate address translation between the first PCIe address space in which the first virtual control module is located and the second PCIe address space in which the second virtual control module is located. The virtual non-transparent bridge converts the first address in the first PCIe address space to the second address in the second PCIe address space based on the address translation. For example, the first address may be a base address while the second address may be the translated address. Besides, it is also possible to configure the same offset value for the low bit address in the first address and the second address, and the virtual non-transparent bridge only needs to convert high bit address in the first address and the second address.

In some embodiments, each virtual control module may be allocated with a routing identifier (ID) based on a default mechanism in the PCIe basic specification, and physical function (PF) and each virtual function (VF) in the PCIe physical device are allocated with identifiers, where each virtual function is associated with a part of physical resources of the PCIe physical device. In some embodiments, based on the alternative routing identifier (ARI) of SR-IOV, the routing identifier may be expanded to support at most 256 objects.

Figure 7:
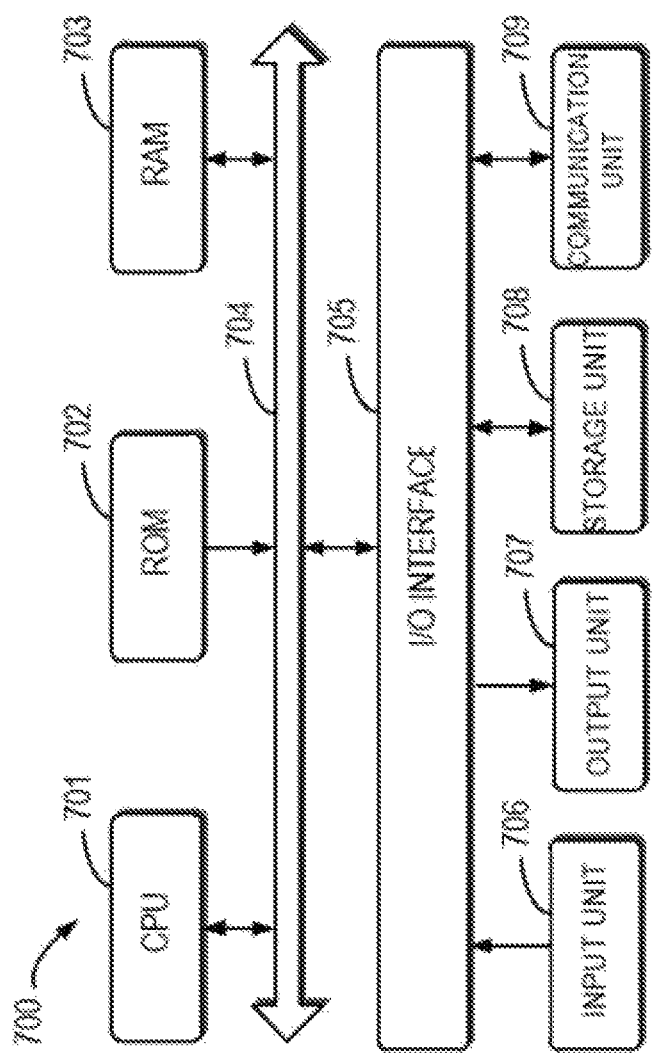
FIG. 7 is a schematic block diagram illustrating a device that can be used to implement embodiments of the present disclosure.

FIG. 7 is a schematic block diagram of a device 700 that can be used to implement embodiments of the present disclosure. As illustrated, the device 700 includes a central processing unit (CPU) 701 which can execute various appropriate actions and processing based on the computer program instructions stored in a read-only memory (ROM) 702 or the computer program instructions loaded into a random access memory (RAM) 703 from a storage unit 708. The RAM 703 also stores all kinds of programs and data required by operating the storage apparatus 700. CPU 701, ROM 702 and RAM 703 are connected to each other via a bus 704 to which an input/output (I/O) interface 705 is also connected.

A plurality of components in the apparatus 700 are connected to the I/O interface 705, including: an input unit 706, such as keyboard, mouse and the like; an output unit 707, such as various types of displays, loudspeakers and the like; a storage unit 708, such as magnetic disk, optical disk and the like; and a communication unit 709, such as network card, modem, wireless communication transceiver and the like. The communication unit 709 allows the apparatus 700 to exchange information/data with other devices through computer networks such as Internet and/or various telecommunication networks.

Each procedure and processing described above may be executed by a processing unit 701. For example, in some embodiments, the method can be implemented as computer software programs, which are tangibly included in a machine-readable medium, such as storage unit 708. In some embodiments, the computer program can be partially or completely loaded and/or installed to the device 700 via ROM 702 and/or the communication unit 709. When the computer program is loaded to RAM 703 and executed by CPU 701, one or more steps of the above described method are implemented.

In some embodiments, the method 500 described above can be implemented as a computer program product. The computer program product may include a computer-readable storage medium loaded with computer-readable program instructions thereon for executing various aspects of the present disclosure.

The computer-readable storage medium can be a tangible device capable of holding and storing instructions used by the instruction-executing device. The computer-readable storage medium can be, but not limited to, for example, electrical storage devices, magnetic storage devices, optical storage devices, electromagnetic storage devices, semiconductor storage devices or any random appropriate combinations thereof. More specific examples (non-exhaustive list) of the computer-readable storage medium comprise: portable computer disk, hard disk, random-access memory (RAM), read-only memory (ROM), erasable programmable read-only memory (EPROM or flash), static random access memory (SRAM), portable compact disk read-only memory (CD-ROM), digital versatile disk (DVD), memory stick, floppy disk, mechanical coding device, such as a punched card storing instructions or an emboss within a groove, and any random suitable combinations thereof. The computer-readable storage medium used herein is not interpreted as a transient signal itself, such as radio wave or other freely propagated electromagnetic wave, electromagnetic wave propagated through waveguide or other transmission medium (such as optical pulses passing through fiber-optic cables), or electric signals transmitted through electric wires.

The computer-readable program instructions described here can be downloaded from the computer-readable storage medium to various computing/processing devices, or to external computers or external storage devices via Internet, local area network, wide area network and/or wireless network. The network can comprise copper transmission cables, optical fiber transmission, wireless transmission, routers, firewalls, switches, gateway computers and/or edge servers. The network adapter or network interface in each computing/processing device receives computer-readable program instructions from the network, and forwards the computer-readable program instructions for storage in the computer-readable storage medium of each computing/processing device.

The computer program instructions for executing the operations of the present disclosure can be assembly instructions, instructions of instruction set architecture (ISA), machine instructions, machine-related instructions, microcodes, firmware instructions, state setting data, or a source code or target code written by any combinations of one or more programming languages including object-oriented programming languages, such as Smalltalk, C++ and so on, and conventional procedural programming languages, such as "C" language or similar programming languages. The computer-readable program instructions can be completely or partially executed on the user computer, or executed as an independent software package, or executed partially on the user computer and partially on the remote computer, or completely executed on the remote computer or the server. In the case where a remote computer is involved, the remote computer can be connected to the user computer by any type of networks, including local area network (LAN) or wide area network (WAN), or connected to an external computer (such as via Internet provided by the Internet service provider). In some embodiments, the electronic circuit is customized by using the state information of the computer-readable program instructions. The electronic circuit may be a programmable logic circuit, a field programmable gate array (FPGA) or a programmable logic array (PLA) for example. The electronic circuit can execute computer-readable program instructions to implement various aspects of the present disclosure.

The computer-readable program instructions can be provided to the processing unit of a general purpose computer, a dedicated computer or other programmable data processing devices to generate a machine, causing the instructions, when executed by the processing unit of the computer or other programmable data processing devices, to generate a device for implementing the functions/actions specified in one or more blocks of the flow chart and/or block diagram. The computer-readable program instructions can also be stored in the computer-readable storage medium. These instructions enable the computer, the programmable data processing device and/or other devices to operate in a particular way, such that the computer-readable medium storing instructions may include a manufactured article that includes instructions for implementing various aspects of the functions/actions specified in one or more blocks of the flow chart and/or block diagram.

The computer-readable program instructions can also be loaded into computers, other programmable data processing devices or other devices, so as to execute a series of operational steps on the computers, other programmable data processing devices or other devices to generate a computer implemented process. Therefore, the instructions executed on the computers, other programmable data processing devices or other devices can realize the functions/actions specified in one or more blocks of the flow chart and/or block diagram.

The accompanying flow chart and block diagram present possible architecture, functions and operations realized by the system, method and computer program product according to a plurality of embodiments of the present disclosure. At this point, each block in the flow chart or block diagram can represent a module, a program segment, or a portion of the instruction. The module, the program segment or the portion of the instruction includes one or more executable instructions for implementing specified logic functions. In some alternative implementations, the function indicated in the block can also occur in an order different from the one represented in the drawings. For example, two consecutive blocks actually can be executed in parallel, and sometimes they may also be executed in a reverse order depending on the involved functions. It should also be noted that each block in the block diagram and/or flow chart, and any combinations of the blocks thereof can be implemented by a dedicated hardware-based system for implementing specified functions or actions, or a combination of the dedicated hardware and the computer instructions.

Various embodiments of the present disclosure have been described above, and the above explanation is illustrative rather than exhaustive and is not limited to the disclosed embodiments. Without departing from the scope and spirit of each explained embodiment, many alterations and modifications are obvious for those ordinary skilled in the art. The selection of terms in the text aims to best explain principle, actual application or technical improvement in the market of each embodiment or make each embodiment disclosed in the text comprehensible for those ordinary skilled in the art.

We claim:

1. A computer-implemented method, comprising:
    deploying a first virtual control module and a second virtual control module in a virtual storage, the first virtual control module and the second virtual control module being redundant with each other;
    creating a virtual Peripheral Component Interconnect Express (PCIe) switch for emulating a physical PCIe switch; and
    synchronizing cache data between the first virtual control module and the second virtual control module via the virtual PCIe switch,
    wherein deploying a first virtual control module and a second virtual control module comprises deploying a respective virtual PCIe interface within each of the virtual control modules to interface the virtual control modules to the virtual PCIe switch, using single-root I/O virtualization by which the virtual control modules can share a single PCIe hardware interface, and wherein the virtual PCIe interface includes a transaction layer, a data link layer and a hardware abstraction layer, the transaction layer including a plurality of virtual circuits as master interfaces for communicating with other components in the virtual PCIe interface, the data link layer including a PCIe transmission module for implementing data communication at a link layer, and the hardware abstraction layer being configured and operative to abstract hardware circuitry to provide operational interface to the transaction layer and data link layer in which hardware and virtual hardware are indistinguishable;

and wherein the hardware abstraction layer includes a DMA module configured and operative to provide direct-memory access (DMA) operation between the virtual control modules via the virtual PCIe switch, the DMA operation being used in the synchronizing of cache data between the first virtual control module and the second virtual control module via the virtual PCIe switch.

2. The method according to claim 1, wherein the creating the virtual PCIe switch comprises:

creating the virtual PCIe switch by emulating at least one of the followings of the physical PCIe switch: PCIe address translation, input/output (I/O) routing, I/O parsing and I/O isolation.

3. The method according to claim 2, wherein the creating the virtual PCIe switch further comprises:

generating an address translation between a first PCIe address space in which the first virtual control module is located and a second PCIe address space in which the second virtual control module is located; and converting a first address in the first PCIe address space into a second address in the second PCIe address space based on the address translation.

4. The method according to claim 1, wherein the synchronizing the cache data comprises:

transmitting the cache data from the first virtual control module to the second virtual control module; and writing the cache data to a virtual disk array of the virtual storage.

5. The method according to claim 1, wherein the synchronizing the cache data comprises:

performing, by the virtual PCIe switch, direct memory access between a first hardware abstraction layer in the first virtual control module and a second hardware abstraction layer in the second virtual control module.

6. The method according to claim 1, further comprising:
creating, using the virtual PCIe switch, communication between a particular physical device enabling PCIe and at least one of the first virtual control module and the second virtual control module.

7. The method according to claim 6, further comprising:
allocating routing identifiers to the first virtual control module and the second virtual control module; and allocating routing identifiers to a plurality of virtual functions in the particular physical device, one of the plurality of virtual functions being associated with a part of physical resources of the particular physical device.

8. The method according to claim 6, further comprising:
adjusting a size of a buffer at the virtual PCIe switch dynamically based on a message feedback received from the particular physical device.

9. An electronic device, comprising:
a processing unit; and
a memory coupled to the processing unit and storing instructions, the instructions, when executed by the processing unit, perform the actions of:

deploying a first virtual control module and a second virtual control module in a virtual storage, the first virtual control module and the second virtual control module being redundant with each other;

creating a virtual Peripheral Component Interconnect Express (PCIe) switch for emulating a physical PCIe switch; and synchronizing cache data between the first virtual control module and the second virtual control module via the virtual PCIe switch, wherein deploying a first virtual control module and a second virtual control module comprises deploying a respective virtual PCIe interface within each of the virtual control modules to interface the virtual control modules to the virtual PCIe switch, using single-root I/O virtualization by which the virtual control modules can share a single PCIe hardware interface, and wherein the virtual PCIe interface includes a transaction layer, a data link layer and a hardware abstraction layer, the transaction layer including a plurality of virtual circuits as master interfaces for communicating with other components in the virtual PCIe interface, the data link layer including a PCIe transmission module for implementing data communication at a link layer, and the hardware abstraction layer being configured and operative to abstract hardware circuitry to provide operational interface to the transaction layer and data link layer in which hardware and virtual hardware are indistinguishable;

and wherein the hardware abstraction layer includes a DMA module configured and operative to provide direct-memory access (DMA) operation between the virtual control modules via the virtual PCIe switch, the DMA operation being used in the synchronizing of cache data between the first virtual control module and the second virtual control module via the virtual PCIe switch.

10. The device according to claim 9, wherein the creating the virtual PCIe switch comprises:

creating the virtual PCIe switch by emulating at least one of the followings of the physical PCIe switch: PCIe address translation, input/output (I/O) routing, I/O parsing and I/O isolation.

11. The device according to claim 10, wherein the creating the virtual PCIe switch further comprises:

generating an address translation between a first PCIe address space in which the first virtual control module is located and a second PCIe address space in which the second virtual control module is located; and converting a first address in the first PCIe address space into a second address in the second PCIe address space based on the address translation.

12. The device according to claim 9, wherein the synchronizing the cache data comprises:

transmitting the cache data from the first virtual control module to the second virtual control module; and writing the cache data to a virtual disk array of the virtual storage.

13. The device according to claim 9, wherein synchronizing the cache data comprises:
    performing direct memory access between a first hardware abstraction layer in the first virtual control module and a second hardware abstraction layer in the second virtual control module through the virtual PCIe switch.

14. The device according to claim 9, the actions further comprising:
    creating, using the virtual PCIe switch, communication between a particular physical device enabling PCIe and at least one of the first virtual control module and the second virtual control module.

15. The device according to claim 14, the actions further comprising:
    allocating routing identifiers to the first virtual control module and the second virtual control module; and
    allocating routing identifiers to a plurality of virtual functions in the particular physical device, one of the plurality of virtual functions being associated with a part of physical resources of the particular physical device.

16. The device according to claim 14, the actions further comprising:
    adjusting a size of a buffer at the virtual PCIe switch dynamically based on a message feedback received from the particular physical device.

17. A computer program product, comprising:
    a non-transitory computer readable medium encoded with computer-executable code, the code configured to enable the execution of:
        deploying a first virtual control module and a second virtual control module in a virtual storage, the first virtual control module and the second virtual control module being redundant with each other;
        creating a virtual Peripheral Component Interconnect Express (PCIe) switch for emulating a physical PCIe switch; and
        synchronizing cache data between the first virtual control module and the second virtual control module via the virtual PCIe switch,
    wherein deploying a first virtual control module and a second virtual control module comprises deploying a respective virtual PCIe interface within each of the virtual control modules to interface the virtual control modules to the virtual PCIe switch, using single-root I/O virtualization by which the virtual control modules can share a single PCIe hardware interface,
    and wherein the virtual PCIe interface includes a transaction layer, a data link layer and a hardware abstraction layer, the transaction layer including a plurality of virtual circuits as master interfaces for communicating with other components in the virtual PCIe interface, the data link layer including a PCIe transmission module for implementing data communication at a link layer, and the hardware abstraction layer being configured and operative to abstract hardware circuitry to provide operational interface to the transaction layer and data link layer in which hardware and virtual hardware are indistinguishable,
    and wherein the hardware abstraction layer includes a DMA module configured and operative to provide direct-memory access (DMA) operation between the virtual control modules via the virtual PCIe switch, the DMA operation being used in the synchronizing of cache data between the first virtual control module and the second virtual control module via the virtual PCIe switch.

18. The computer program product of claim 17, wherein the creating the virtual PCIe switch comprises:
    creating the virtual PCIe switch by emulating at least one of the followings of the physical PCIe switch: PCIe address translation, input/output (I/O) routing, I/O parsing and I/O isolation.

19. The computer program product of claim 18, wherein the creating the virtual PCIe switch further comprises:
    generating an address translation between a first PCIe address space in which the first virtual control module is located and a second PCIe address space in which the second virtual control module is located; and
    converting a first address in the first PCIe address space into a second address in the second PCIe address space based on the address translation.

20. The computer program product of claim 17, wherein the synchronizing the cache data comprises:
    transmitting the cache data from the first virtual control module to the second virtual control module; and
    writing the cache data to a virtual disk array of the virtual storage.

21. The computer program product of claim 17, wherein the synchronizing the cache data comprises:
    performing, by the virtual PCIe switch, direct memory access between a first hardware abstraction layer in the first virtual control module and a second hardware abstraction layer in the second virtual control module.

22. The computer program product of claim 17, wherein the code is further configured to enable the execution of:
    creating, using the virtual PCIe switch, communication between a particular physical device enabling PCIe and at least one of the first virtual control module and the second virtual control module.

23. The computer program product of claim 22, wherein the code is further configured to enable the execution of:
    allocating routing identifiers to the first virtual control module and the second virtual control module; and
    allocating routing identifiers to a plurality of virtual functions in the particular physical device, one of the plurality of virtual functions being associated with a part of physical resources of the particular physical device.

* * * * *